United States Patent
Kanatsu

(10) Patent No.: US 7,134,776 B2
(45) Date of Patent: Nov. 14, 2006

(54) DIRECT BACKLIGHT AND DISPLAY DEVICE

(75) Inventor: Tsutomu Kanatsu, Kawasaki (JP)

(73) Assignee: NEC LCD Corporation, Kanagawa (JP)

(*) Notice: Subject to any disclaimer, the term of this patent is extended or adjusted under 35 U.S.C. 154(b) by 95 days.

(21) Appl. No.: 11/039,888

(22) Filed: Jan. 24, 2005

(65) Prior Publication Data
US 2005/0162869 A1 Jul. 28, 2005

(30) Foreign Application Priority Data
Jan. 23, 2004 (JP) ............... 2004-015922

(51) Int. Cl.
F21V 15/04 (2006.01)
F21S 19/00 (2006.01)

(52) U.S. Cl. .......... 362/561; 349/155; 349/56; 349/58; 349/60; 362/23; 362/28; 362/29; 362/223; 362/235; 362/236; 362/551; 362/559; 362/632

(58) Field of Classification Search ............ 349/56, 349/58, 60, 155; 362/23, 28, 29, 223, 235, 362/236, 551, 559, 632
See application file for complete search history.

(56) References Cited

U.S. PATENT DOCUMENTS 6,836,304 B1* 12/2004 Sakamaki et al. .......... 349/106
6,902,300 B1* 6/2005 Lee ............................ 362/306

FOREIGN PATENT DOCUMENTS

| JP | 10-326517  | 12/1998 |
| JP | 2002-116704 | 4/2002 |
| JP | 2002-244118 | 8/2002 |
| JP | 2003039060 | * 2/2003 |

* cited by examiner

Primary Examiner—Renee Luebke
Assistant Examiner—Mary Zettl
(74) Attorney, Agent, or Firm—Young & Thompson

(57) ABSTRACT

A direct backlight includes a plastic spacer pin. The spacer pin is formed of a semispherical portion and a conical frustum portion. The spacer pin is disposed such that the thicker end of the conical frustum portion is coupled to the bottom surface of the chassis, with the semispherical portion placed to face a diffuser plate. The radius of curvature of the tip of the semispherical portion is 0.3 mm to 1 mm. The diameter of the end of the conical frustum portion on the semispherical portion side is 1.1 mm to 2 mm. The ratio (L/B) is less than 5 where L is the length of the spacer pin and B is the diameter of the thicker end of the conical frustum portion.

7 Claims, 2 Drawing Sheets

DIRECT BACKLIGHT AND DISPLAY DEVICE

BACKGROUND OF THE INVENTION

1. Field of the Invention

The present invention relates to a direct backlight used in display devices and a display device incorporating the backlight.

2. Description of the Related Art

A liquid crystal display device includes a liquid crystal panel for forming images and a backlight for supplying light to the liquid crystal panel. The backlight is largely classified into two types: a direct backlight and an edge lit backlight. The direct backlight includes a plurality of elongated light sources placed behind the liquid crystal panel when viewed from a viewer. The edge lit backlight includes a light guide plate placed behind the liquid crystal panel and an elongated light source placed along an edge of the light guide plate. The direct backlight is configured such that the plurality of elongated light sources are attached to mounts, and a reflector sheet placed behind the elongated light sources to reflect light emitted from the elongated light sources toward the liquid crystal panel. In front of the elongated light sources, i.e., on the liquid crystal panel side, there is provided a diffuser plate for diffusing light emitted from the elongated light sources, thereby uniformly distributing the light across its area. The diffuser plate is typically a white translucent plastic plate. The mounts, the reflector sheet, and the diffuser plate are fixed to a chassis. For example, the chassis is box-shaped and configured to accommodate therein the mounts, the reflector sheet, and the diffuser plate.

Furthermore, for example, as disclosed in Japanese Patent Laid-Open Publications No. Hei 10-326517, No. 2002-116704, and No. 2002-244118, the direct backlight also includes a spacer pin which is erected from the bottom surface of the chassis toward the diffuser plate. The spacer pin is intended to allow its tip to contact with the diffuser plate when the diffuser plate is deflected toward the elongated light sources, thereby restricting the diffuser plate from being further deflected. A relatively small direct backlight has one spacer pin disposed at its center, whereas a relatively large direct backlight has a plurality of spacer pins. In general, the spacer pin is formed of a white resin in the shape of a truncated cone to prevent it from being visually recognized by the viewer.

However, the aforementioned conventional techniques have the following problems. That is, the spacer pin is preferably made as thin as possible to prevent it from being visually recognized by the viewer. However, a spacer pin that is made excessively thin would be broken when the direct backlight is subjected to external forces such as vibrations or shocks. Additionally, when a user carries a display device, the direct backlight may be shaken so that the tip of the spacer pin and the diffuser plate are rubbed against each other, causing abnormal noises to occur.

To enhance the strength of the spacer pin, it may be contemplated to form a metal material into a truncated cone member by cutting, which is then painted on its surface to form the spacer pin. However, this method requires high costs to manufacture the spacer pin and is thus impractical. Furthermore, a thin spacer pin made of metal would raise a problem that its base portion, i.e., the joint portion with the chassis may be easily broken, and the diffuser plate may be whittled when rubbed against the spacer pin.

SUMMARY OF THE INVENTION

An object of the present invention is to provide a direct backlight which is manufactured at low costs, prevents the spacer pin from being visually recognized by the viewer, never causes the spacer pin to be broken when the direct backlight is subjected to external forces such as vibrations and shocks, and never causes abnormal noises to occur due to vibrations. Another object of the invention is to provide a display device which incorporates this direct backlight.

A direct backlight according to the present invention is placed behind a display panel of a display device to supply light to the display panel. The direct backlight includes a light source, a diffuser plate for diffusing light emitted from the light source, a chassis, and a spacer pin. The chassis has a part thereof disposed opposite to the diffuser plate with respect to the light source, and supports the light source and the diffuser plate. The spacer pin is formed of a resin and erected from the part of the chassis toward the diffuser plate. The spacer pin has a semispherical portion forming one end portion on the diffuser plate side and a frustum portion forming the other end portion on the part of the chassis side. One end of the frustum portion on the part of the chassis side is larger in thickness than the other end on the semispherical portion side. The radius of curvature of the tip of the semispherical portion is 0.3 mm to 1 mm. The thickness of the end of the frustum portion on the semispherical portion side is 1.1 mm to 2 mm. The ratio (L/B) is less than 5 where B is the thickness of the end of the frustum portion on the part of the chassis side, and L is a length from the end of the spacer pin on the diffuser plate side to the end thereof on the part of the chassis side.

According to the present invention, the spacer pin is formed of a resin and thus manufactured at low costs. Additionally, the radius of curvature of the tip on the diffuser plate side, which is 0.3 mm to 1 mm, allows the spacer pin to contact with the diffuser plate on a curved surface, thereby causing no abnormal noises to occur even when the spacer pin rubs against the diffuser plate. Furthermore, the thickness of the end of the frustum portion on the semispherical portion side is 1.1 mm or more and the ratio (L/B) is less than 5, thereby making the spacer pin resistant to external force such as vibrations and shocks. Still furthermore, the thickness of the end of the frustum portion on the semispherical portion side is 2 mm or less, thereby preventing the spacer pin from being visually recognized by the viewer. The shape of the semispherical portion is not limited to a mathematically exact semi-sphere, i.e., a sphere exactly halved, but may be accepted if the radius of curvature of the tip falls within the aforementioned range.

Furthermore, the spacer pin may also have a pole portion between the semispherical portion and the frustum portion. In this case, the pole portion has a length of 4 mm or less and a thickness equal to that of the end of the frustum portion on the semispherical portion side.

This allows for reducing the thickness of the portion of the spacer pin on the diffuser plate side, thereby further ensuring that the spacer pin is prevented from being visually recognized by the viewer.

A display device according to the present invention includes a display panel, and a direct backlight which is disposed behind the display panel to supply light to the display panel. The direct backlight includes a light source, a diffuser plate for diffusing light emitted from the light source, a chassis, and a spacer pin. The chassis has a part thereof disposed opposite to the diffuser plate with respect to the light source, and supports the light source and the diffuser plate. The spacer pin is formed of a resin and erected from the part of the chassis toward the diffuser plate. The spacer pin has a semispherical portion forming one end portion on the diffuser plate side and a frustum portion forming the other end portion on the part of the chassis side. One end of the frustum portion on the part of the chassis side is larger in thickness than the other end on the semispherical portion side. The radius of curvature of the tip of the semispherical portion is 0.3 mm to 1 mm. The thickness of the end of the frustum portion on the semispherical portion side is 1.1 mm to 2 mm. The ratio (L/B) is less than 5 where B is the thickness of the end of the frustum portion on the part of the chassis side, and L is the length from the end of the spacer pin on the diffuser plate side to the end thereof on the part of the chassis side. The display panel may be a liquid crystal display panel.

According to the present invention, the shape of the spacer pin is specified as described above. This makes it possible to provide a direct backlight at low costs which prevents the spacer pin from being easily broken even when the direct backlight is subjected to external force such as vibrations and shocks. The backlight also causes no abnormal noises to occur even when the direct backlight is shaken and prevents the spacer pin from being visually recognized by the viewer.

DETAILED DESCRIPTION OF THE PREFERRED EMBODIMENTS

Figure 1:
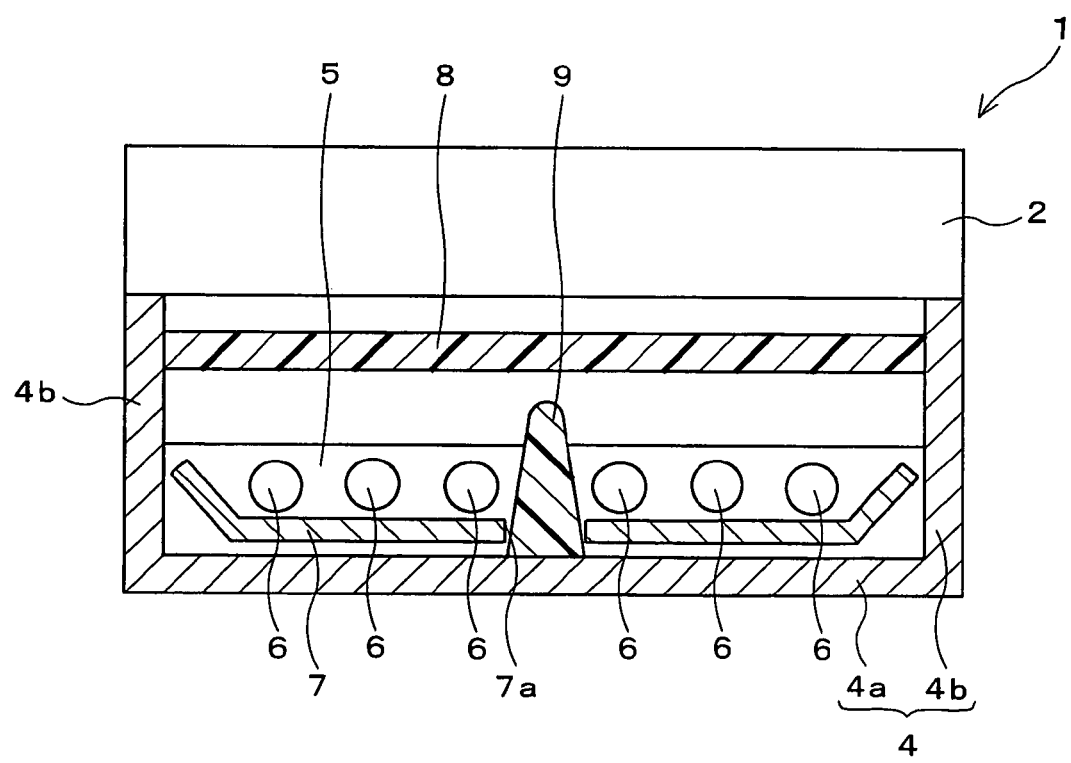
FIG. 1 is a cross-sectional view illustrating a liquid crystal display device according to a first embodiment of the present invention.
Figure 2:
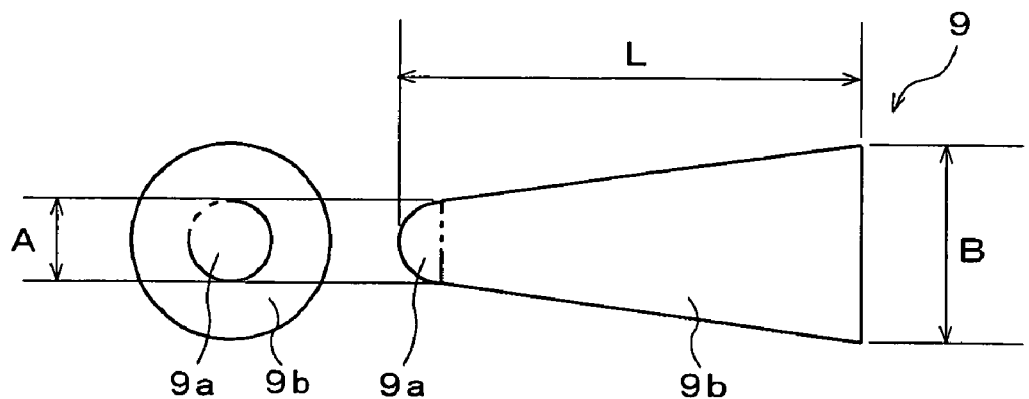
FIG. 2 shows front and side views of a spacer pin according to the first embodiment.

Now, the present invention will be described more specifically with reference to the accompanying drawings in accordance with the embodiments. Now, the present invention will be described below in accordance with a first embodiment. FIG. 1 is a cross-sectional view illustrating a liquid crystal display device according to the first embodiment. FIG. 2 shows front and side views of a spacer pin according to this embodiment. As shown in FIG. 1, a liquid crystal display device 1 according to this embodiment is provided with a liquid crystal panel 2, and a direct backlight 3 behind the liquid crystal panel 2. The liquid crystal panel 2 forms images when an external image signal is supplied thereto. The direct backlight 3 supplies light to the liquid crystal panel 2.

The direct backlight is provided with a chassis 4 which is formed of, e.g., a metal or an alloy. The chassis 4 is box-shaped including a bottom plate 4a and side plates 4b. On a pair of edge portions opposite to each other inside the chassis 4, there are placed a pair of mounts 5 which are fixed to the chassis 4. The pair of mounts 5 support a plurality of cold cathode tubes 6. That is, the cold cathode tubes 6 are bar-shaped and supported at respective ends thereof by the pair of mounts 5. Between the bottom plate 4a of the chassis 4 and the cold cathode tubes 6, there is a reflector sheet 7 fixedly disposed on the chassis 4. The reflector sheet 7 reflects light emitted from the cold cathode tubes 6 forwardly, i.e., toward the liquid crystal panel 2.

There is also provided a diffuser plate 8 in front of the cold cathode tubes 6 in the chassis 4. For example, the diffuser plate 8 is a white translucent resin plate, and adapted to diffuse light emitted from the cold cathode tubes 6 as well as light which is emitted from the cold cathode tubes 6 and then reflected off of the reflector sheet 7. Additionally, some area on the diffuser plate 8 directly above the cold cathode tubes 6 is slightly darkened by printing as compared to the other area. As described above, the chassis 4 supports the cold cathode tubes 6, the mounts 5, the reflector sheet 7, and the diffuser plate 8. The bottom plate 4a of the chassis 4 is disposed opposite to the diffuser plate 8 with respect to the cold cathode tubes 6. There may be provided an optical sheet (not shown) between the diffuser plate 8 and the liquid crystal panel 2.

There is one opening 7a formed at the center of the reflector sheet 7 with one spacer pin 9 provided to penetrate the opening 7a. The spacer pin 9 is coupled to the center of the bottom plate 4a of the chassis 4 and erected toward the diffuser plate 8. The spacer pin 9 is formed of a white-tinted resin, e.g., polycarbonate or ABS resin (Acrylonitrile Butadiene Styrene copolymer resin). There is provided a narrow gap between the spacer pin 9 and the diffuser plate 8, such that the diffuser plate 8 is in no contact with the spacer pin 9 when the diffuser plate 8 is flat but abuts against the spacer pin 9 when the diffuser plate 8 is slightly deflected.

As shown in FIG. 2, the spacer pin 9 includes a semispherical portion 9a and a conical frustum portion 9b. The semispherical portion 9a and the conical frustum portion 9b are integrated with each other. The semispherical portion 9a forms an end portion of the spacer pin 9 on the diffuser plate 8 side, while the conical frustum portion 9b forms the end portion of the spacer pin 9 on the bottom plate 4a of the chassis 4 side. One end of the conical frustum portion 9b on the chassis 4 side is larger in thickness than the other end on the semispherical portion 9a side. That is, the spacer pin 9 is coupled at the thicker end of the conical frustum portion 9b to the bottom plate 4a of the chassis 4 (see FIG. 1) so that the semispherical portion 9a is disposed closer to the diffuser plate 8 (see FIG. 1). For example, the semispherical portion 9a has the shape of a sphere partially cut off by a plane, e.g., a semi-sphere with the radius of curvature "R" of its tip being 0.3 mm to 1 mm. However, the shape of the semispherical portion 9a is not necessarily a part of a sphere but may be accepted if the radius of curvature "R" of the tip is 0.3 mm to 1 mm.

The conical frustum portion 9b has the shape of a truncated cone, with the diameter "A" of the end in contact with the semispherical portion 9a being smaller than the diameter "B" of the end in contact with the bottom plate 4a of the chassis 4. The diameter "A" is 1.1 to 2 mm. Additionally, the ratio (L/B) is less than 5 where "L" is the entire length of the spacer pin 9. For example, the radius of curvature of the semispherical portion 9a is 0.3 mm, the diameter "A" of the conical frustum portion 9b is 1.8 mm, the diameter "B" is 3.8 mm, and the length "L" of the spacer pin 9 is 14 mm, therefore the value of ratio (L/B) is about 3.7. Now, explanations will be given to the reasons for employing the limited numerical values according to the requirements set by the present invention.

Radius of Curvature of the Tip of the Semispherical Portion: 0.3 to 1 mm

A spacer pin having a flat tip without the semispherical portion provided at the tip portion of the spacer pin would cause abnormal noises to occur when the spacer pin rubs against the diffuser plate. Even with a semispherical portion provided, its tip having a radius of curvature being less than 0.3 mm or greater than 1 mm would also cause abnormal noises to occur when the tip rubs against the diffuser plate. Therefore, it is necessary for the tip of the semispherical portion to have a radius of curvature of 0.3 mm to 1 mm.

Thickness of the End of the Frustum Portion on the Semispherical Portion Side: 1.1 mm to 2 mm The end of the frustum portion on the semispherical portion side having a thickness of less than 1.1 mm would cause the spacer pin to be reduced in strength. This may cause the spacer pin to be easily broken when external force such as vibrations and shocks is applied to the direct backlight. Additionally, the end of the frustum portion on the semispherical portion side having a thickness of less than 1.1 mm would cause the spacer pin to be swung, thereby causing abnormal noises to occur. On the other hand, the aforementioned thickness being greater than 2 mm would cause the viewer of the display device to visually recognize the spacer pin, thus providing images degraded in display quality. Therefore, the thickness of the end of the frustum portion on the semispherical portion side should be 1.1 mm to 2 mm. When the frustum portion is a conical frustum portion having a truncated cone shape, the thickness of the frustum portion means its diameter.

Ratio (L/B): Less Than 5

A spacer pin with the ratio (L/B) being 5 or greater would be excessively thin and thus reduced in strength, thereby being easily broken when external force such as vibrations and shocks is applied to the direct backlight. Additionally, the spacer pin may also be reduced in rigidity. Thus, the spacer pin may be swung when the direct backlight is shaken, thereby causing abnormal noises to occur. For the above reasons, the ratio (L/B) should be less than 5.

Now, an explanation is given to the operation of the liquid crystal display device according to the present embodiment configured as described above. The cold cathode tubes 6 emit light when powered. The light emitted from the cold cathode tubes 6 is then transmitted toward the diffuser plate 8, either directly or reflected off of the reflector sheet 7. Then, the diffuser plate 8 uniformly diffuses the light, which is in turn directed into the liquid crystal panel 2. During this operation, the liquid crystal panel 2 forms images in response to an external input image signal. Thus, the light incident upon the liquid crystal panel 2 from the diffuser plate 8 passes through the liquid crystal panel 2 while allowing the images to be added to the light.

The diffuser plate 8 may be deflected due to its own weight or the like. A deflection in the diffuser plate 8 toward the cold cathode tubes 6 would cause the tip of the spacer pin 9 to contact with the diffuser plate 8, thereby preventing the diffuser plate 8 from being further deflected. Suppose that the direct backlight 3 is subjected to external force such as vibrations and shocks with the tip of the spacer pin 9 in contact with the diffuser plate 8. In this case, the external force is transferred to both the end portions of the spacer pin 9 via the chassis 4 and the diffuser plate 8, thereby causing the spacer pin 9 to be mechanically loaded. Absence of the spacer pin 9 would lead to a significant deflection in the diffuser plate 8. This may cause some area on the diffuser plate 8 darkened by printing relative to the other area to be dislocated from directly above the cold cathode tubes 6, thus resulting in unevenness in display.

In the embodiment, the spacer pin 9 is shaped as described above. This will serve to prevent the spacer pin 9 from being broken or from rubbing against the diffuser plate 8 to cause abnormal noises to occur even when external force such as vibrations and shocks is applied to the direct backlight 3. That is, the direct backlight 3 has advantageously resistance to damage and silencing property. Furthermore, the spacer pin 9 will never be visually recognized by the viewer through the liquid crystal panel 2 and the diffuser plate 8. That is, the spacer pin 9 is advantageously well concealed. Still furthermore, the spacer pin 9 formed of a resin can be manufactured at low costs, and never whittle the diffuser plate 8 when rubbed against the diffuser plate 8.

Figure 3:
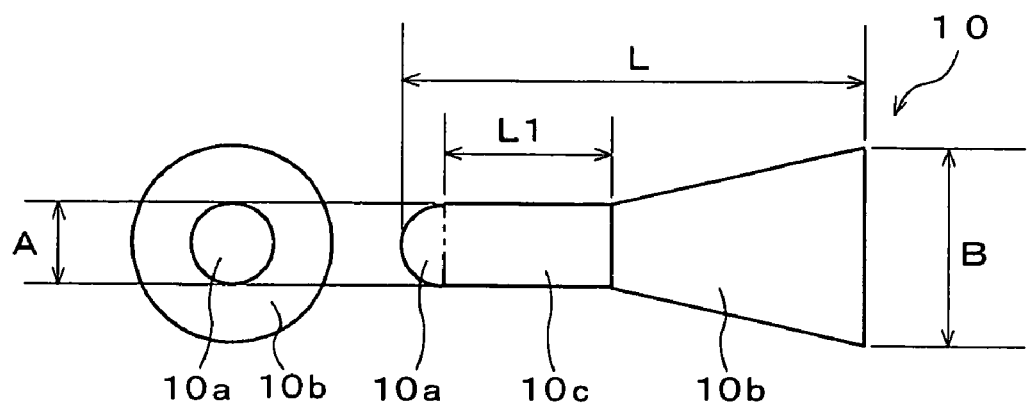
FIG. 3 shows front and side views of a spacer pin according to a second embodiment of the present invention.

Now, the present invention will be described below in accordance with a second embodiment. FIG. 3 shows front and side views of a spacer pin according to the second embodiment. As shown in FIG. 3, the present embodiment is different from the aforementioned first embodiment in that a spacer pin 10 is employed in place of the spacer pin 9. This embodiment is configured in the same manner as the first embodiment except the aforementioned modification.

As shown in FIG. 3, the spacer pin 10 includes a conical frustum portion 10b, a cylindrical portion 10c as a pole portion, and a semispherical portion 10a from the bottom plate 4a of the chassis 4 (see FIG. 1) in that order. The conical frustum portion 10b, the cylindrical portion 10c, and the semispherical portion 10a are integrally formed of a white-tinted resin such as polycarbonate or ABS resin. The spacer pin 10 is coupled at the thicker end of the conical frustum portion 10b to the bottom plate 4a of the chassis 4 so that the semispherical portion 10a is disposed closer to the diffuser plate 8 (see FIG. 1). The semispherical portion 10a and the conical frustum portion 10b are the same in shape as the semispherical portion 9a and the conical frustum portion 9b (see FIG. 2) according to the aforementioned first embodiment, respectively.

For example, the cylindrical portion 10c has the shape of a cylinder, whose diameter (thickness) is equal to the diameter "A" of the conical frustum portion 10b on the cylindrical portion 10c side and whose length "L1" is 4 mm or less. In the present embodiment, for example, the radius of curvature "R" of the semispherical portion 10a is 0.3 mm, the diameter "A" of the conical frustum portion 10b is 1.2 mm, the diameter "B" is 8 mm, the length "L1" of the cylindrical portion 10c is 3.5 mm, and the entire length "L" of the spacer pin 10 is 11 mm, therefore the value of ratio (L/B) is about 1.4. Now, explanations will be given to the reasons for employing the limited numerical values according to the requirements set by the present invention.

Length of the Dole Portion: 4 mm or Less

A pole portion having a length greater than 4 mm would cause the spacer pin to be excessively thin and thus reduced in strength, thereby causing the spacer pin to be easily broken when external force such as vibrations and shocks is applied to the direct backlight. Therefore, the pole portion should have a length of 4 mm or less.

This embodiment provides the cylindrical portion 10c between the semispherical portion 10a and the conical frustum portion 10b. This allows the portion of the spacer pin 10 on the diffuser plate 8 side to be made thinner when compared with the aforementioned first embodiment. It is thus possible to more positively prevent the spacer pin 10 from being visually recognized by the viewer. The operations and effects of this embodiment other than mentioned above are the same as those of the aforementioned first embodiment.

In the aforementioned first and second embodiments, the exemplary direct backlights shown above include only one spacer pin; however, the present invention is not limited thereto. The backlight may also include two or more spacer pins depending on the screen area of the display device. Furthermore, in the aforementioned first and second embodiments, the frustum portion is the conical frustum portion having the shape of a truncated cone and the pole portion is the cylindrical portion having the shape of a cylinder. However, the frustum portion may also have the shape of a frustum of a truncated pyramid while the pole portion can also have a prismatic shape. Furthermore, the display device according to the present invention is not limited to a liquid crystal display device but may also be any type of display devices so long as the display devices include a direct backlight.

Now, a specific description will be given to the effects of the examples of the present invention in comparison with comparative examples which depart from the scope of the invention defined by the claims. First, a white-tinted polycarbonate resin was prepared which had a tensile yield stress of 60 MPa and a modulus of elasticity of 2600 MPa. The resin was molded into four spacer pins as shown in FIG. 2 each including a semispherical portion and a conical frustum portion and three spacer pins as shown in FIG. 3 each including a semispherical portion, a cylindrical portion, and a conical frustum portion. At this stage, the spacer pins were made to be different from each other in size at each portion.

Then, these spacer pins were each incorporated into the direct backlight according to the aforementioned first embodiment to built a liquid crystal display device. Using these display devices, evaluations were made of: the concealability indicative of the possibility of the spacer pin being visually recognized; the resistance to damage indicative of the possibility of the spacer pin being broken when an external force is applied to the direct backlight; and the silencing property indicative of the possibility of the spacer pin and the diffuser plate rubbing against each other to cause abnormal noises to occur when vibrations are applied to the direct backlight.

To evaluate the concealability, measurements were made on the luminance of the screen of the display devices. A drop of 2% or more in luminance level at the location of a spacer pin relative to its adjacent area was considered that display unevenness had occurred and the evaluation was thus determined to be no good "NG." On the other hand, for a drop below 2% in the aforementioned luminance level, the evaluation was determined to be good "OK." For the evaluation of the resistance to damage, the liquid crystal display devices were subjected to vibration and shock tests on the assumption of the transportation of the display devices. When the vibration and shock tests showed that the spacer pin was broken or the diffuser plate was damaged, the evaluation was determined to be no good "NG." Contrary, when neither the spacer pin was broken nor the diffuser plate was damaged, the evaluation was determined to be good "OK." For the evaluation of the silencing property, the display device was shaken vertically and horizontally while being held by hands to check for the occurrence of abnormal noises. When the check showed that abnormal noises occurred, the evaluation was determined to be no good "NG," whereas no abnormal noises were heard, the evaluation was determined to be good "OK."

Table 1 shows the shapes of the spacer pins, and table 2 shows the evaluation results of each of the aforementioned properties. In Table 1, "Type" indicates whether the spacer pin has a cylindrical portion. The spacer pin of "Type 1" includes the semispherical portion and the conical frustum portion as described above in accordance with the aforementioned first embodiment (see FIG. 2). The spacer pin of "Type 2" includes the semispherical portion, the cylindrical portion, and the conical frustum portion as described above in accordance with the aforementioned second embodiment (see FIG. 3). The "radius of curvature R" indicates the radius of curvature of the tip of the semispherical portion. The diameter "A" indicates the diameter of the end of the conical frustum portion on the semispherical portion side, while the diameter "B" shows the diameter of the end of the conical frustum portion on the chassis side. The "length L" indicates the entire length of the spacer pin, while the "length L1" shows the length of the cylindrical portion. Furthermore, in table 2, "OK" shows that the evaluation was determined to be good, whereas "NG" shows being no good.

TABLE 1

| | | | Shape of Spacer Pin | | | | |
| --- | --- | --- | --- | --- | --- | --- | --- |
| | No. | Type | Radius of Curvature R (mm) | Diameter A (mm) | Diameter B (mm) | Length L (mm) | Ratio (L/B) | Length L1 (mm) |
| Example | 1 | 1 | 0.57 | 1.14 | 4.00 | 18.8 | 4.7 | 0 |
| Comparative Example | 2 | 1 | 0 | 1.00 | 3.00 | 16.5 | 5.5 | 0 |
| Example | 3 | 2 | 0.30 | 1.20 | 8.00 | 11.0 | 1.4 | 3.5 |
| Example | 4 | 2 | 0.30 | 1.20 | 6.00 | 11.0 | 1.8 | 3.5 |
| Comparative Example | 5 | 2 | 0 | 1.00 | 7.00 | 8.0 | 1.1 | 3.0 |
| Example | 6 | 1 | 0.30 | 1.80 | 3.80 | 14.0 | 3.7 | 0 |
| Comparative Example | 7 | 1 | 0 | 2.10 | 3.00 | 16.5 | 5.5 | 0 |

TABLE 2

| | | Evaluation Results | | |
| --- | --- | --- | --- | --- |
| | No. | Concealability | Resistance to damage | Silencing property |
| Example | 1 | OK | OK | OK |
| Comparative Example | 2 | OK | OK | NG |
| Example | 3 | OK | OK | OK |
| Example | 4 | OK | OK | OK |
| Comparative Example | 5 | OK | NG | OK |
| Example | 6 | OK | OK | OK |
| Comparative Example | 7 | NG | OK | OK |

As seen in Tables 1 and 2, the examples No. 1, No. 3, No. 4, and No. 6 show that the shapes of the spacer pins satisfy the scope of the present invention, thus all providing good concealability, resistance to damage, and silencing property.

In contrast to this, the comparative example No. 2, which has a radius of curvature "R" less than 0.30 mm, a diameter "A" less than 1.1 mm, and a ratio (L/B) greater than 5, generated abnormal noises when subjected to vibrations, and thus exhibited a bad silencing property. On the other hand, the comparative example No. 5, which has a radius of curvature "R" less than 0.3 mm and a diameter "A" less than 1.1 mm, caused the spacer pin to be broken when an external force was applied to the direct backlight, and thus exhibited a bad resistance to damage. Furthermore, the comparative example No. 7, which has a diameter "A" greater than 2 mm, caused the spacer pin to be visually recognized, and thus exhibited a bad concealability.

What is claimed is:

1. A direct backlight placed behind a display panel of a display device to supply light to said display panel, comprising:
    a light source;
    a diffuser plate for diffusing light emitted from said light source;
    a chassis having a part thereof disposed opposite to said diffuser plate with respect to said light source, for supporting said light source and said diffuser plate; and
    a spacer pin formed of a resin and erected from said part of said chassis toward said diffuser plate, said spacer pin comprising: a semispherical portion forming one end portion on said diffuser plate side; and a frustum portion forming the other end portion on said part of said chassis side, and one end of said frustum portion on said part of said chassis side being larger in thickness than the other end on said semispherical portion side, a radius of curvature of the tip of said semispherical portion being 0.3 mm to 1 mm, the thickness of the end of said frustum portion on said semispherical portion side being 1.1 mm to 2 mm, and a ratio (L/B) being less than 5 where B is the thickness of the end of said frustum portion on said part of said chassis side, and L is a length from the end of said spacer pin on said diffuser plate side to the end thereof on said part of said chassis side.

2. The direct backlight according to claim 1, wherein said frustum portion has a truncated cone shape.

3. The direct backlight according to claim 1, wherein said spacer pin further comprises a pole portion between said semispherical portion and said frustum portion, said pole portion has a length of 4 mm or less and a thickness equal to that of the end of said frustum portion on said semispherical portion side.

4. A display device comprising:
    a display panel; and
    a direct backlight placed behind the display panel to supply light to the display panel, the direct backlight comprising:
    a light source;
    a diffuser plate for diffusing light emitted from said light source;
    a chassis having a part thereof disposed opposite to said diffuser plate with respect to said light source, for supporting said light source and said diffuser plate; and
    a spacer pin formed of a resin and erected from said part of said chassis toward said diffuser plate, said spacer pin comprising: a semispherical portion forming one end portion on said diffuser plate side; and a frustum portion forming the other end portion on said part of said chassis side, and one end of said frustum portion on said part of said chassis side being larger in thickness than the other end on said semispherical portion side, a radius of curvature of the tip of said semispherical portion being 0.3 mm to 1 mm, the thickness of the end of said frustum portion on said semispherical portion side being 1.1 mm to 2 mm, and a ratio (L/B) being less than 5 where B is the thickness of the end of said frustum portion on said part of said chassis side, and L is a length from the end of said spacer pin on said diffuser plate side to the end thereof on said part of said chassis side.

5. The display device according to claim 4, wherein said frustum portion has a truncated cone shape.

6. The display device according to claim 4, wherein said spacer pin further comprises a pole portion between said semispherical portion and said frustum portion, said pole portion has a length of 4 mm or less and a thickness equal to that of the end of said frustum portion on said semispherical portion side.

7. The display device according to claim 4, wherein said display panel is a liquid crystal display panel.

* * * * *